United States Patent [19]
Lindhe

[11] Patent Number: 5,944,878
[45] Date of Patent: Aug. 31, 1999

[54] MULTIPLE-ELEMENT AIR FILTER

[75] Inventor: Curt Lindhe, Söderbärke, Sweden

[73] Assignee: Curt Lindhe Konsult & Forvaltnings AB, Soderbarke, Sweden

[21] Appl. No.: 08/930,931

[22] PCT Filed: Apr. 10, 1996

[86] PCT No.: PCT/SE96/00464

§ 371 Date: Oct. 10, 1997

§ 102(e) Date: Oct. 10, 1997

[87] PCT Pub. No.: WO96/32180

PCT Pub. Date: Oct. 17, 1996

[30] Foreign Application Priority Data

Apr. 12, 1995 [SE] Sweden ................. 9501369

[51] Int. Cl.⁶ ............ B01D 53/04; B01D 53/82
[52] U.S. Cl. ............ 96/132; 96/134; 96/154
[58] Field of Search ............ 96/121, 131, 132, 96/134–142, 153, 154

[56] References Cited

U.S. PATENT DOCUMENTS

| | | | |
|---|---|---|---|
| 1,789,194 | 1/1931 | Rockwell | 96/132 X |
| 3,961,919 | 6/1976 | Lamoreaux | 96/132 |
| 4,236,902 | 12/1980 | Fricke | 96/137 |
| 4,239,516 | 12/1980 | Klein | 55/389 |
| 4,266,561 | 5/1981 | Litzinger | 96/135 X |
| 4,382,440 | 5/1983 | Kapp et al. | 96/131 X |
| 4,451,435 | 5/1984 | Hölter et al. | 96/139 X |
| 4,530,817 | 7/1985 | Hölter et al. | 96/139 X |
| 4,534,775 | 8/1985 | Frazier | 55/74 |
| 4,572,178 | 2/1986 | Takase et al. | 96/132 X |
| 4,610,705 | 9/1986 | Sarnosky et al. | 96/135 |
| 4,629,479 | 12/1986 | Cantoni | 96/142 X |
| 4,892,719 | 1/1990 | Gesser | 423/245.1 |
| 4,985,210 | 1/1991 | Minami | 96/132 X |
| 5,423,903 | 6/1995 | Schmitz et al. | 55/385.3 X |
| 5,529,609 | 6/1996 | Gooch et al. | 96/154 X |
| 5,591,244 | 1/1997 | Vross et al. | 96/142 X |

FOREIGN PATENT DOCUMENTS

| | | |
|---|---|---|
| 124 263 | 11/1984 | European Pat. Off. . |
| 162 022 | 11/1985 | European Pat. Off. . |
| 398 847 | 11/1990 | European Pat. Off. . |
| 583 594 | 2/1994 | European Pat. Off. . |
| 0 385 240 B1 | 4/1994 | European Pat. Off. . |
| 0155543 | 6/1982 | Germany ............ 96/142 |
| 3724806 | 2/1989 | Germany ............ 96/134 |
| 4015506 | 11/1991 | Germany ............ 96/134 |
| 55-024561 | 2/1980 | Japan ............ 96/140 |
| 2-052037 | 2/1990 | Japan ............ 96/153 |

*Primary Examiner*—Robert Spitzer
*Attorney, Agent, or Firm*—Pillsbury Madison & Sutro Intellectual Property Group

[57] ABSTRACT

An air filtering unit for preparing highly purified air comprising: a) an inert separation filter for removing solid particular matter, b) a filter element comprising solids adsorbing molecules by using van der Waal forces; c) a filter element comprising molecular sieves; and optionally d) a filter element having the ability of binding polar, acid or basic molecules.

2 Claims, 1 Drawing Sheet

MULTIPLE-ELEMENT AIR FILTER

BACKGROUND OF THE INVENTION

The present invention relates to a multiple filter unit for purifying air in closed environments. The filter unit is insertable into ventilation and air conditioning systems. It can also advantageously be used in motor vehicles.

The industrialization of the world has resulted in extensive atmospheric pollution. Any type of combustion, e.g. from industrial plants, motorization or general heating, leads to final products which have to be dispersed or settled. These are constituted by, among all, oxygenated carbon compounds, unburned hydrocarbons, nitrogen oxides, oxygenated sulphur compounds, water vapor and unbuned or incombustible solid particles. It can be a health hazard to breathe in certain areas where the traffic is dense and/or the industrial pollution is extensive. This is also often the case in motor vehicle coupes, especially in traffic jams.

Inside modern buildings, other noxious polluting substances which are released from the furniture pieces, wall coatings and the like, may be present.

Hence, there is a great need of methods for removing different sorts of polluting substances from air.

Various pollutant removal methods are available in the state of the art, such as:

a) mechanical filtering (removal of solid particles);
b) conversion of gaseous pollutants into other products and recovery of the new substances;
c) decomposition of gaseous pollutants and conversion into harmless products;
d) conversion into easily eliminated products;
e) elimination of gaseous pollutants by cooling and condensation; and
f) elimination by absorption/adsorption.

A lot of pollutant-removal methods rely upon different kinds of absorption and adsorption. EP-0 162 022 relates to an interchangeable multiple filter unit, especially for motor vehicles and air conditioning. The filter unit comprises mechanical and absorbing filter elements. Those absorbing elements comprises gas absorbing materials such as activated carbon. The filter unit also comprise a catalyst for converting CO to $CO_2$.

Filter systems based upon adsorption by activated carbon are widely used for removing polluting gases and vapors from air. The vander Waals' forces of the carbon particles lead to adsorption of the polluting substances. However, such filter systems do not remove gaseous pollutants to a satisfying extent. Especially small uncharged molecules, such as hydrocarbons, and a major fraction of molecules having certain functional groups such as NOX, SOX, aldehydes, etc. will pass through the filter unit and contaminate the purified air. Moreover, if molecules adsorbed on active carbon are exposed to oxidizing compounds such as ozone, these compounds can be converted to other compounds not binding to active carbon. An example of such compounds is unsaturated hydrocarbons which are converted into releasable aldehydes by ozone.

EP-A2-0 398 847 relates to an air filter comprising a mechanical filter for removing solid particles, an adsorption filtering layer consisting of activated carbon and two chemical filtering layers flanking the mechanical filter on both sides. One of these layers is acidic and the other one is basic. This filter can absorb a larger range of contaminating substances than the filter according to EP-0 162 022, but small uncharged molecules without acidic or basic groups will also pass through this filter.

Polyimide has been shown to possess interesting properties in non-cryogenic gas separation processes. EP-0 385 240 describes a polyimide membrane that can be used in the process of recovering $O_2$ from an $O_2/N_2$ stream or air. U.S. Pat. No. 4 892 719 discloses a glass fiber furnace filter coated with a polymeric amine such as polyethylene imine. According to this document, indoor pollutants such as formaldehyde, or acidic gases such as $SO_2$, $NO_2$, and $H_2S$ can be removed from a house by a reactive method consisting of a coating on a furnace filter in a forced-air heating system.

However, these polyimine filters have the drawback of not adsorbing polluting molecules lacking polar functional groups. Thus, only a very narrow range of molecules can be adsorbed by such a filter.

EP-A1-0 583 594 discloses a system and a method for removing hydrocarbons from a gaseous mixture where the system comprises different zeolites acting as molecular sieves. Molecules having a larger size than a certain predetermined value are trapped inside the zeolite particle. The system according to EP-0 583 594 is very efficient and consequently, it is easy to fill the zeolite particles with contaminating gas molecules as well as solid particles. If the filter shall be used for a long time, it is essential that the air that is to be filtered already is purified to a large extent. Zeolites are expensive and to use a filter system according to EP-0 583 594, where it often is necessary to change the zeolites in order to maintain sufficient adsorption can lead to very high costs.

Currently, no filter construction has the ability of satisfying purifying polluted air comprising a large amount of different polluting substances, such as air containing cigarette smoke. The same applies to air containing smelling substances.

Consequently, there is a need for an air filter having the ability to absorb a broad range of contaminating substances from solid particles to small hydrocarbons without causing unnecessarily high operation costs.

SUMMARY OF THE INVENTION

The problems related to the aforesaid filter units can be overcome by using a filter unit according to the present invention which comprises:

a) an inert separation filter for removing solid particulate matter, such as dust particles;
b) a filter element comprising solids that adsorb large molecules by using van der Walls forces such as activated carbon;
c) a filter element having sufficiently small pores (molecular sieves) to prevent tiny uncharged molecules such as short hydrocarbons from penetrating the element, such as an element made of zeolites; and
d) a filter element having the ability of binding molecules containing polar functional groups.

Polymers containing acidic carboxylic acid groups (—COOH) or sulfonic acid groups (—$SO_3H$), such as polyethylenesulfonic acid, can be used to remove basic gaseous substances, such as ammonia or amines. Polymers containing basic amine groups, such as polyethyleneimine, polyallylanune, polyvinylamine and polyethylene hydrazine can be used to remove aldehydes such as formaldehyde, or acid gases such as $H_2S$, $SO_2$, $SO_3$, NO, $NO_2$, $N_2O_5$, HF, HCl, HBr, and HI. 2-amino-2-hydroxymethyl-1,3-propanediol has very good aldehyde absorbing properties.

The molecular sieves preferably consist of zeolites, such as ZSM-5 zeolite, beta zeolite, mordernite, and Ultra-stable Y.

The inert separation filter element comprises known components for removing particulate matter, such as filtering beds comprising fibrous materials, microporous membranes such as Nylon 66, etc. Any inert filter element with the ability of removing particles larger than 0,2 Tm can be used.

Thus, the present invention provides a filter unit which, without high working expenses, has the ability of absorbing a broad range of contaminating substances. The unit is adapted to remove solid particles such as bacteria, viruses, mold spores, asbestos particles and dust, molecules having functional groups, such as NOX, SOX, aldehydes and organic acids, and small uncharged molecules, such as hydrocarbons.

Such a filter unit has not been seriously contemplated before for many reasons. Firstly, due to the large amount of units working according to different principles. the filter is very complex, and accordingly considered to be expensive. Secondly, it has been considered to be unnecessary to use another kind of filter together with the active carbon unit.

However, some polluting compounds can be released from active carbon after exposure to oxidizing compounds, such as ozone. For example, unsaturated hydrocarbons are converted to aldehydes by ozone, and these aldehydes are released from the active carbon filter. The filter construction according to the present invention is equipped with a unit which adsorbs aldehydes downstream from the active carbon unit. By the present invention, it is hence possible to get very pure air at a rather moderate price. Cigarette smell is completely removed from air after purification with the filter according to the present invention.

The filter unit can be used in most cases where it is desirable to have clean air, such as in ventilation equipment for offices, houses and industrial environments, motor vehicles and kitchen fans.

The filter unit is reliable in performance, simple and inexpensive to use, and can easily be manufactured.

In the following, the present invention will be described more thoroughly with reference to the following unlimiting examples.

BRIEF DESCRIPTION OF THE DRAWINGS

The invention will now be described with reference to the accompanying figure, where.

DESCRIPTION OF THE PREFERRED EMBODIMENTS

Figure 1:
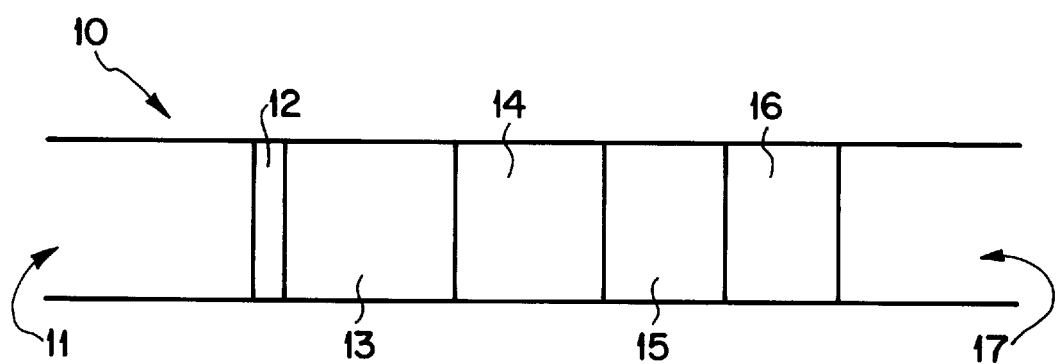
FIG. 1 is a schematic view illustrating an embodiment of the invention.

With reference to the figure of the accompanying drawing, the air filtering unit according to the present invention, which is generally indicated as (10), comprises a supporting frame of a substantially known type, which supports in its inside a plurality of combined filtering layers.

As is shown in FIG. 1, the air is sucked into an inlet (11) by a fan (12). The air then passes through an inert separation filter element (13) which removes solid particles having a particle size greater than 0.2 Tm. The filter element comprises fibrous materials.

A filter element (14) containing adsorbing particles of activated carbon is situated downstream of the inert separation filter element (13). In this filter element, molecules having high molecular weights are adsorbed as a result of vander Walls' forces.

A filter element (15) containing inert porous carriers coated by polyethyleneimine, polyethylene hydrazine, and polyethylenesulfonic acid is inserted downstream of the filter element (14) containing activated carbon particles. Molecules containing aldehyde groups, amine groups, and acid gaseous substances are all adsorbed in this filter element.

As is shown in FIG. 1, the last filter element (16) that the air passes through comprises the zeolite ZSM-5, which has sufficiently small pores to prevent tiny uncharged molecules such as short hydrocarbons, from penetrating the unit. After this zeolite filter element (16), the purified air is transported out from the air filtering unit through an outlet (17).

I claim:

1. A multiple-element air filter, comprising:
   a supporting frame having an air inlet and an air outlet; and
   a series of air filter elements arranged in said supporting frame such that air passing from said inlet to said outlet through said supporting frame must pass through each of said air filter elements;
   said air filter elements including:
   a first filter element containing solid particles which are capable of adsorbing molecules from said air by van van der Waals' forces;
   a second filter element comprising molecular sieves capable of straining short chain hydrocarbons from said air; and
   a third filter element, which is capable of binding with at least one of polar, acidic and basic gaseous substances and thereby removing the substances from the air, said third filter element comprising at least one of polyethyleneimine, 2-amino-2-hydroxymethyl-1,3-propanediol, polyethylenesulfonic acid and polyethylene hydrazine.

2. A multiple-element air filter, comprising:
   a supporting frame having an air inlet and an air outlet; and
   a series of air filter elements arranged in said supporting frame such that air passing from said inlet to said outlet through said supporting frame must Pass through each of said air filter elements;
   said air filter elements including:
   a first filter element containing solid particles which are capable of adsorbing molecules from said air by van der Waals' forces, said first filter element comprising activated carbon particles;
   a second filter element comprising molecular sieves capable of straining short chain hydrocarbons from said air, said molecular sieves of said second filter element comprising at least one zeolite; and
   a third filter element, which is capable of binding with at least one of polar, acidic and basic gaseous substances and thereby removing the substances from the air, said third filter element comprising at least one of polyethyleneimine, 2-amino-2-hydroxymethyl-1,3-propanediol, polyethylenesulfonic acid and polyethylene hydrazine.

* * * * *